United States Patent
Park et al.

(10) Patent No.: US 8,442,537 B2
(45) Date of Patent: May 14, 2013

(54) MOBILITY MANAGEMENT METHOD FOR USE IN CELLULAR MOBILE COMMUNICATION SYSTEM

(75) Inventors: Soon Gi Park, Daejeon (KR); Yeon Seung Shin, Daejeon (KR); Jae Sheung Shin, Daejeon (KR); Sung Gu Choi, Daejeon (KR); Yeong Jin Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/334,417

(22) Filed: Dec. 22, 2011

(65) Prior Publication Data

US 2012/0165023 A1    Jun. 28, 2012

(30) Foreign Application Priority Data

Dec. 23, 2010    (KR) .......................... 10-2010-0133085

(51) Int. Cl.
*H04Q 7/20*    (2006.01)
(52) U.S. Cl.
USPC ............ 455/439; 455/438; 455/436; 370/331
(58) Field of Classification Search ............... 455/439, 455/438, 436; 370/331
See application file for complete search history.

(56) References Cited

U.S. PATENT DOCUMENTS

| | | | |
|---|---|---|---|
| 2008/0227455 A1* | 9/2008 | Kim | 455/436 |
| 2009/0005052 A1* | 1/2009 | Abusch-Magder et al. | 455/446 |
| 2009/0104909 A1 | 4/2009 | Vesely et al. | |
| 2009/0154426 A1* | 6/2009 | Perraud et al. | 370/332 |
| 2009/0298515 A1* | 12/2009 | Czaja et al. | 455/456.5 |
| 2010/0093350 A1* | 4/2010 | Wang et al. | 455/436 |
| 2010/0128601 A1* | 5/2010 | Bennett et al. | 370/225 |
| 2010/0210271 A1 | 8/2010 | Neubacher | |
| 2011/0237259 A1* | 9/2011 | Dimou et al. | 455/437 |

FOREIGN PATENT DOCUMENTS

| | | |
|---|---|---|
| KR | 2001-0017860 | 3/2001 |
| KR | 1020090120020 | 11/2009 |
| KR | 1020100065154 | 6/2010 |

* cited by examiner

*Primary Examiner* — Danh Le
(74) *Attorney, Agent, or Firm* — Nelson Mullins Riley & Scarborough LLP; EuiHoon Lee, Esq.

(57) ABSTRACT

Disclosed is a mobility management method for use in a cellular mobile communication system. The mobility management method is configured to save radio resources and provide a stable service by detecting a cell in which a dwell time of user equipment (UE) is short as an island cell and performing a direct handover (HO) to an appropriate cell without handing over the UE to the island cell. There are provided three methods including a base station-based method, a UE measurement-based method, and a UE history-based method according to how to measure a dwell time in which the UE stays in a cell, a component in which obtained information is received within a network, and how to process an HO using the information.

8 Claims, 8 Drawing Sheets

| IE/Group Name | Presence | IE Type and reference | Semantics description |
|---|---|---|---|
| Message Type | M | HANDOVER REPORT | |
| Handover Report Type | M | ENUMERATED (HO too early, ho to wrong cell, RAPID HO, ) — 510 | |
| Source cell ECGI | M | ECGI | Cell A |
| Failure cell ECGI | M | ECGI | Cell C |
| Final cell ECGI | C-ifHandoverReport Type RapidHo | ECGI | ECGI of cell after a rapid HO cell B |
| | | | |

| IE/Group Name | Presence | Range | IE Type and reference |
|---|---|---|---|
| Last Visited Cell List | | 1 to maxnoofCells | |
| >Last Visited Cell Information | M | 1010 | |

Last Visited Cell Information  1020

| IE/Group Name | Presence | Range | IE Type and reference |
|---|---|---|---|
| Global Cell ID | M | | ECGI |
| Cell Type | M | | |
| Time UE stayed in cell | M | | INTEGER (0..4095) |

1021 — Global Cell ID
1022 — Cell Type
1023 — Time UE stayed in cell

MOBILITY MANAGEMENT METHOD FOR USE IN CELLULAR MOBILE COMMUNICATION SYSTEM

CLAIM FOR PRIORITY

This application claims priority to Korean Patent Application No. 10-2010-0133085 filed on Dec. 23, 2010 in the Korean Intellectual Property Office (KIPO), the entire contents of which are hereby incorporated by reference.

BACKGROUND

1. Technical Field

Example embodiments of the present invention relate to cellular mobile communication technology, and more particularly, to a method of managing mobility of user equipment (UE) in a cellular mobile communication system that may detect a coverage hole and avoid an effect of the coverage hole on the basis of related data.

2. Related Art

A coverage hole is an area where a signal of another cell of a neighbor is locally well detected around a boundary between a cell A and a cell B that are planned to be geographically adjacent. This coverage hole may cause various problems.

Figure 1:
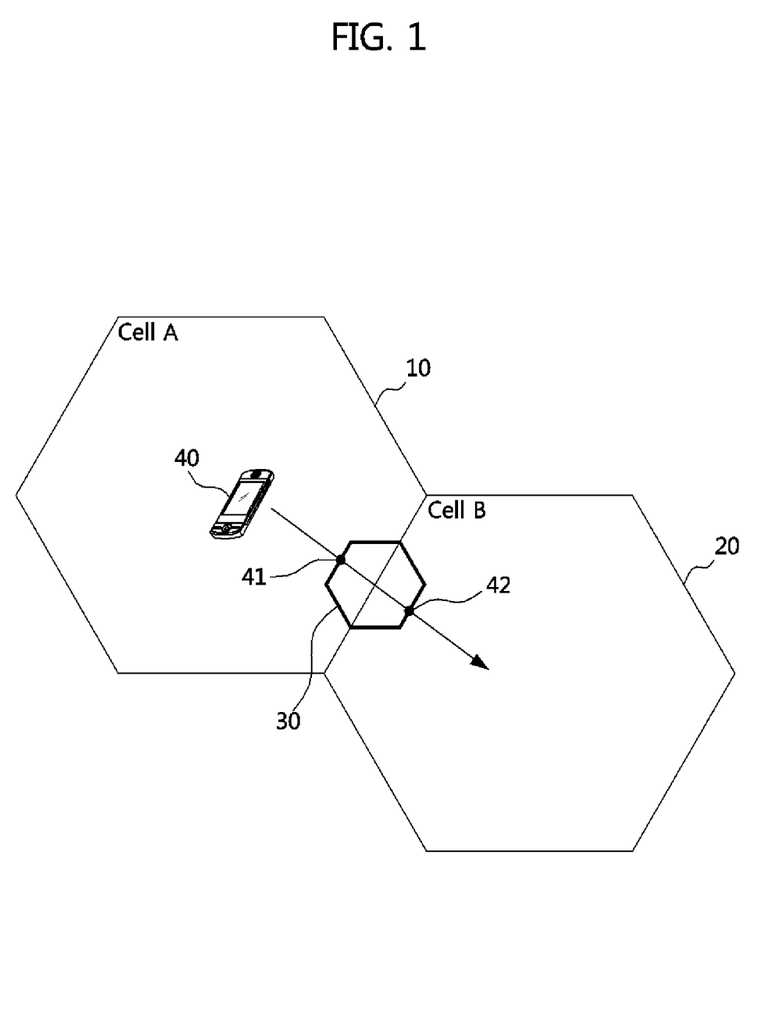
FIG. 1 is a conceptual diagram illustrating a state in which a coverage hole occurs and its problem.

FIG. 1 is a conceptual diagram illustrating a state in which a coverage hole occurs and its problem.

Referring to FIG. 1, the coverage hole is defined as an area where a signal of another cell (cell C) is well detected around a boundary between the cells A and B due to various reasons in a state in which a cell A 10 and a cell B 20 are planned to be geographically adjacent according to an operator's normal intention. The cell C may be referred to as an island cell in that local coverage is formed like an island within the coverage of other cells.

In this case, when UE 40 is handed over to an area 30 of the cell C, which is the island cell (ingress handover (HO)), and when the UE 40 is handed over from the cell C (egress handover), an HO failure probability is very high. To automatically sense the HO failure probability, the operator needs many driving tests and stored operation data.

When UEs move around the cell C, which is the island cell, an unnecessary ping-pong HO may occur, unnecessary radio resources may be consumed, and excessive signaling may adversely affect a network.

In the related art, there is a problem in that coverage-hole detection may not be systematically performed due to coverage contamination, and an error of the coverage-hole detection may be determined to be a radio link failure (RLF) and processed through an RLF recovery process or merely recognized as a failure.

SUMMARY

Accordingly, example embodiments of the present invention are provided to substantially obviate one or more problems due to limitations and disadvantages of the related art.

Example embodiments of the present invention provide a mobility management method for UE in a cellular mobile communication system that may detect a coverage hole and avoid the effect of a coverage hole on the basis of information regarding the detected coverage hole.

In some example embodiments, a mobility management method for use in a mobile communication system, includes: (a) measuring, by a second base station, a dwell time until user equipment (UE) handed over from a first base station to the second base station is handed over to a third base station; (b) transmitting a message from the second base station to the first base station, wherein the message includes at least one of information indicating the dwell time and information indicating that the dwell time is equal to or less than a predetermined threshold if the dwell time is equal to or less than the predetermined threshold; and (c) storing and managing, by the first base station, the at least one of the information indicating the dwell time and the information indicating that the dwell time is equal to or less than the predetermined threshold included in the message, and changing priority of a handover (HO) candidate for the second base station when an HO from the first base station to the second base station is performed on the basis of the stored information.

In the mobility management method, the dwell time in operation (a) may be a time from when the second base station has received an HO complete radio resource control (RRC) message from the UE to when the second base station has transmitted an HO command RRC message to the UE.

In the mobility management method, the message in operation (b) may be an HO report X2 application protocol (X2AP) message transmitted from the second base station to the first base station. In this case, the information indicating that the dwell time is equal to or less than the predetermined threshold included in the message in operation (b) may be designated as one HO report type, which is an enumerated information element (IE) defined in the HO report X2AP message.

In the mobility management method, the message in operation (b) may additionally include information specifying the third base station, and the first base station in operation (c) may additionally store the information specifying the third base station and change priorities of HO candidates for the second base station and the third base station when the HO from the first base station to the second base station is performed on the basis of the stored information. In this case, the information specifying the third base station may be enhanced cell global identifier (ID) (ECGI) information of the third base station.

In other example embodiments, a mobility management method for use in a cellular mobile communication system, includes: (a) instructing, by a first base station, UE to provide a periodic measurement report (MR) when the UE is handed over from the first base station to a second base station; and (b) determining, by the second base station, whether to perform an HO to a base station other than the second base station for the UE on the basis of a reception state of the periodic MR.

In the mobility management method, operation (a) may include: transmitting, by the first base station, an HO command RRC message to the UE. In this case, operation (a) may include: instructing to provide the periodic MR using a periodic MR field within measurement information among mobility control IEs within the HO command RRC message.

In the mobility management method, the reception state of the periodic MR in operation (b) may be determined by comparing the number of periodic MRs received in the second base station during a predetermined period to the predetermined number of times.

In still other example embodiments, a mobility management method for use in a cellular mobile communication system, includes: (a) transmitting, by a source base station, information indicating a dwell time in the source base station of UE and information specifying the source base station to a target base station during an HO of the UE; and (b) storing, by the target base station, the information along with the same type of information, which is transmitted from a base station other than the source base station, as a type of the information, and determining priority of an HO candidate on the basis of the stored information upon decision of a candidate base station when the UE is handed over from the target base station.

In the mobility management method, the dwell time in the source base station of the UE may be a time from when the source base station has received an HO complete RRC message from the UE to when the source base station has transmitted an HO command RRC message to the UE.

In the mobility management method, operation (a) may include: transmitting, by the source base station, an HO request X2AP message to the target base station.

In the mobility management method, when the target base station stores the information in operation (b), latest information may be preferentially stored if the amount of information exceeds an amount of information capable of being stored. In addition, when the target base station stores the information in operation (b), a dwell time for a source base station in which the dwell time is short and information specifying the source base station may be preferentially stored if the amount of information exceeds the amount of information capable of being stored.

In the mobility management method, when the target base station determines the priority of the HO candidate on the basis of the stored information in operation (b), a base station in which a dwell time is short may have low HO priority and be excluded from the HO candidate.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the present invention will be described in detail with reference to the accompanying drawings.

Figure 2:
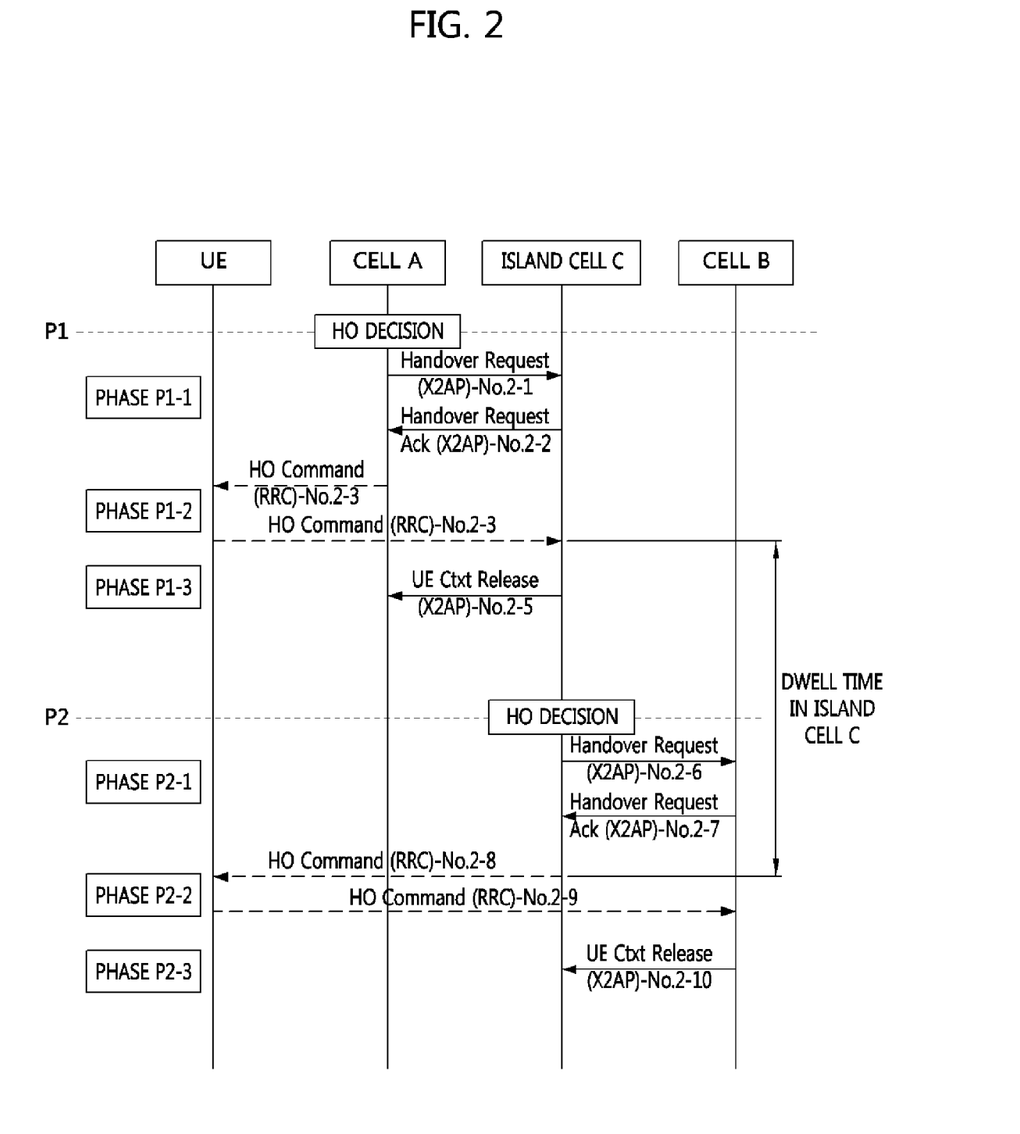
FIG. 2 is a sequence diagram showing an HO procedure of the related art between UE and base stations when the UE passes through the coverage hole in a state in which the coverage hole is present.

FIG. 2 is a sequence diagram showing an HO procedure of the related art between UE and base stations when the UE passes through the coverage hole in a state in which the coverage hole is present.

Referring to FIGS. 1 and 2 together, an HO from a cell A 10 to a cell C 30 is determined in a first position 41 of FIG. 1, and an ingress HO to the cell C 30, which is an island cell, is completed when a procedure of phases P1-1, P1-2, and P1-3 of FIG. 2 is completed. Likewise, an HO from the cell C 30 to a cell B 20 is determined in a second position 42 of FIG. 1, and an egress HO from the cell C 30, which is the island cell, is completed when a procedure of phases P2-1, P2-2, and P2-3 of FIG. 2 is completed.

In a mobility management method according to an example embodiment of the present invention, the cell C 30 is determined to be the island cell in that a time of No. 2-4 to No. 2-8 (that is, a dwell time in which the UE stays in the cell C) is very short. Consequently, the present invention may be configured to save radio resources and provide a stable service by handing over the UE to the cell B 20 without handing over from the cell A 10 to the cell C 30 using characteristics of the island cell or by performing a fast egress HO from the cell C 30.

For this, in an example embodiment of the present invention, there are provided three methods including 1) a base station-based method, 2) a UE measurement-based method, and 3) a UE history-based method according to how to measure a dwell time in which the UE stays in the cell C 30, a component in which obtained information is received within a network, and how to process an HO using the information.

Hereinafter, three mobility management methods through detection and avoidance of the coverage hole according to example embodiments of the present invention will be described in detail.

Base Station-Based Method

Figure 3:
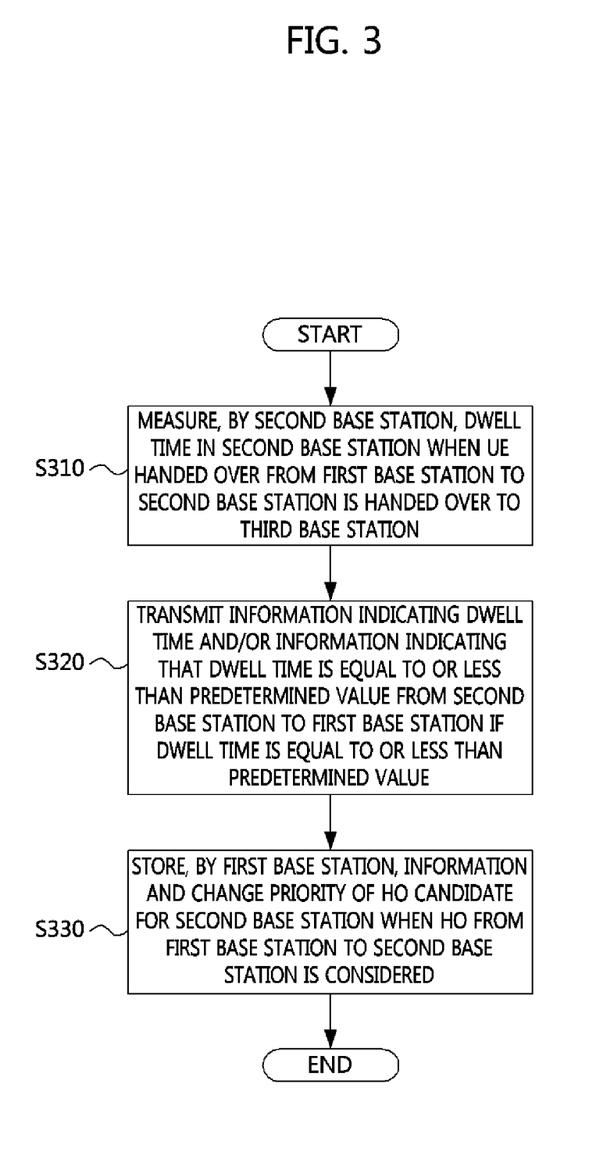
FIG. 3 is a flowchart illustrating a base station-based method as an example of a mobility management method for use in a cellular mobile communication system according to an example embodiment of the present invention.

FIG. 3 is a flowchart illustrating the base station-based method as an example of a mobility management method for use in a cellular mobile communication system according to an example embodiment of the present invention.

Referring to FIG. 3, the base station-based method according to the example embodiment of the present invention may include: (a) measuring, by a second base station, a dwell time until UE handed over from a first base station to the second base station is handed over to a third base station (S310); (b) transmitting a message from the second base station to the first base station, wherein the message includes at least one of information indicating the dwell time and information indicating that the dwell time is equal to or less than a predetermined threshold if the dwell time is equal to or less than the predetermined threshold (S320); and (c) storing and managing, by the first base station, the at least one of the information indicating the dwell time and the information indicating that the dwell time is equal to or less than the predetermined threshold included in the message, and changing priority of an HO candidate for the second base station when an HO from the first base station to the second base station is considered on the basis of the stored information (S330).

Hereinafter, the base station-based method will be described with reference to FIGS. 1 and 3 together.

As seen from a moving path of the UE as described with reference to FIG. 1, the egress HO of the UE is fast after the ingress HO to the island cell C 30, or the dwell time in the island cell C 30 is short even when a normal HO does not occur, in terms of characteristics of the island cell C 30.

Accordingly, in operation S310, the second base station (a base station of the cell C of FIG. 1) measures the dwell time until the UE 40 is handed over to the third base station when the UE 40 is handed over from the first base station (a base station of the cell A of FIG. 1) to the second base station (the base station of the cell C of FIG. 1).

At this time, the dwell time may be a time from when the second base station has received an HO complete RRC message from the UE 40 to when the second base station has transmitted an HO command RRC message to the UE 40.

Next, in operation S320, the second base station transmits information indicating the dwell time in the second base station, which controls the cell C as the island cell, to the first base station. At this time, the information indicating the dwell time is not constantly transmitted to the first base station, but the information indicating the dwell time and/or information indicating that the dwell time is equal to or less than the predetermined threshold are included in a message only if the dwell time for which the UE stays is equal to or less than the predetermined threshold, and transmitted to the first base station, so that it is possible to reduce signaling overhead between base stations. In addition, at this time, the second base station may include and transmit information specifying the third base station along with the message to the first base station. At this time, the information specifying the third base station may be an ECGI.

Next, in operation S330, a base station which controls the first base station continuously stores and manages information transmitted by the second base station, and changes priority of an HO candidate for the second base station when an HO to the second base station is considered in the future on the basis of the information. That is, operations S310 and S320 are continuously performed, and information indicating dwell times in various base stations of UEs is collected and stored in the first base station.

When the first base station, which controls the cell A 10, makes an HO decision for the connected UE on the basis of the stored information, the cell C 30 may be assigned low priority even when a signal is relatively strong if the cell C 30 is included in HO candidate cells. That is, it is possible to prevent an HO from the cell A 10 to the cell C 30 when an amount of stored information becomes large. Because it is possible to recognize the fact that an HO from the cell C 30 to the cell B 20 is performed in a short time after the HO from the cell A 10 to the cell C 30 if the information specifying the third base station is also included in the message transmitted in operation S320, candidate priority of the cell B 20 is set to be higher than that of the cell C 30. Accordingly, it is possible to make the decision of a direct HO from the cell A 10 to the cell B 20 not through the cell 30.

Figure 4:
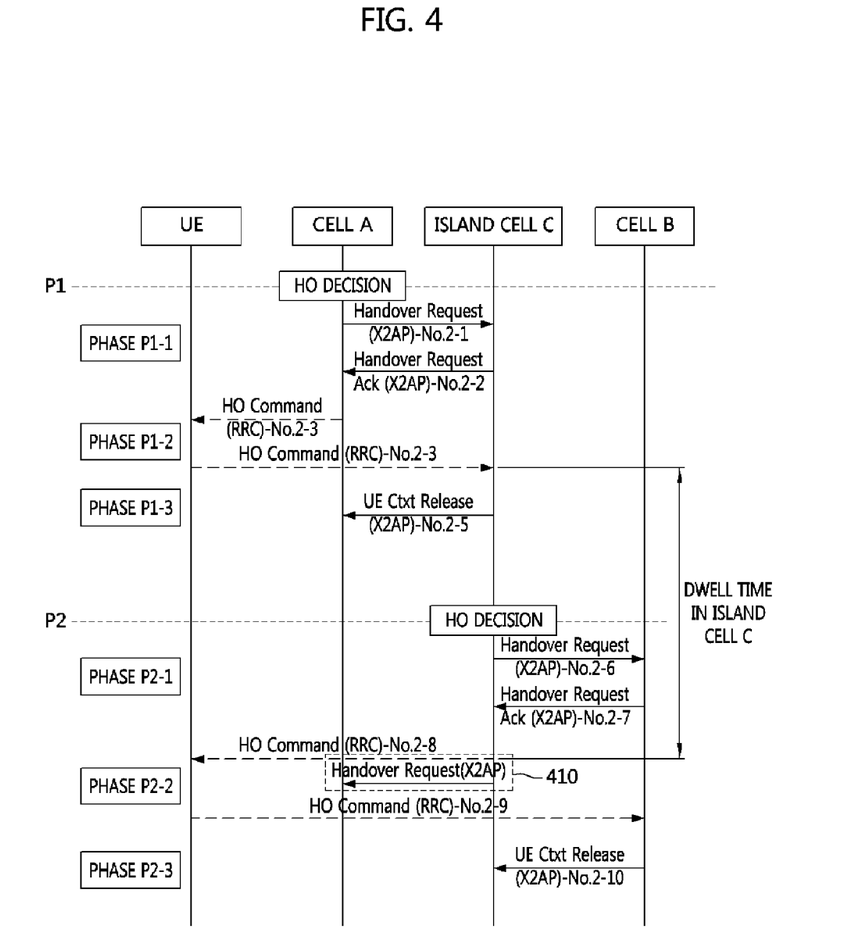
FIG. 4 is a sequence diagram showing an HO procedure between UE and base stations when the UE passes through the coverage hole in the base station-based method according to an example embodiment of the present invention.

FIG. 4 is a sequence diagram showing an HO procedure between UE and base stations when the UE passes through the coverage hole in the base station-based method according to an example embodiment of the present invention.

In the procedure of FIG. 4 compared to FIG. 2, the second base station, which controls the cell C 30, transmits message No. 2-8 to the UE after determining to perform an HO to the cell B 20, and transmits an HO report message to the first base station, which controls the cell A 10 serving as a previous serving cell, using an X2AP message 410 in phase P2-2.

Figure 5:
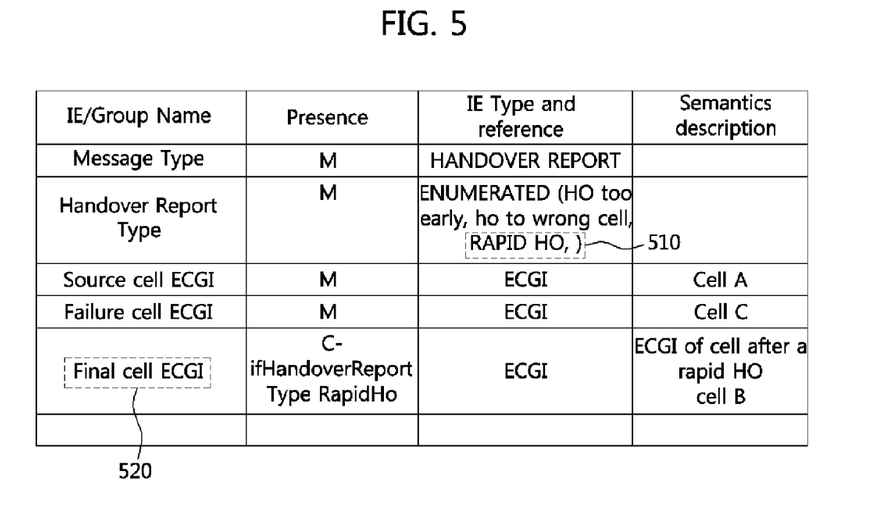
FIG. 5 is a data structure diagram illustrating an example of a configuration of an HO report message in the base station-based method according to an example embodiment of the present invention.

FIG. 5 is a data structure diagram illustrating an example of a configuration of the HO report message in the base station-based method according to an example embodiment of the present invention.

Referring to FIG. 5, a "rapid HO" 510 is added to an HO report type of an enumerated data structure in an existing HO report message (that is, information indicating that a dwell time is equal to or less than the predetermined threshold). In addition, if the HO report type is the "rapid HO," the information (final cell ECGI 520) specifying the third base station may be configured to be included therein. For example, the information specifying the third base station may be an ECGI of the cell B 20 as described with reference to FIG. 3.

Accordingly, although the first base station of the cell A 10 receiving the above-described HO report determines an HO from the cell A 10 to the cell C 30 for a certain UE and the UE is handed over to the cell C 30, the cell C 30 may know the fact that the UE has been directly handed over to the cell B 20 (on the basis of a final cell ECGI). It is possible to collect the above-described information, prevent the cell C 30 from being a target cell using the collected information to adjust priority of an HO candidate, and directly perform an HO to the cell B 20 instead of the cell C 30.

UE Measurement-Based Method

Figure 6:
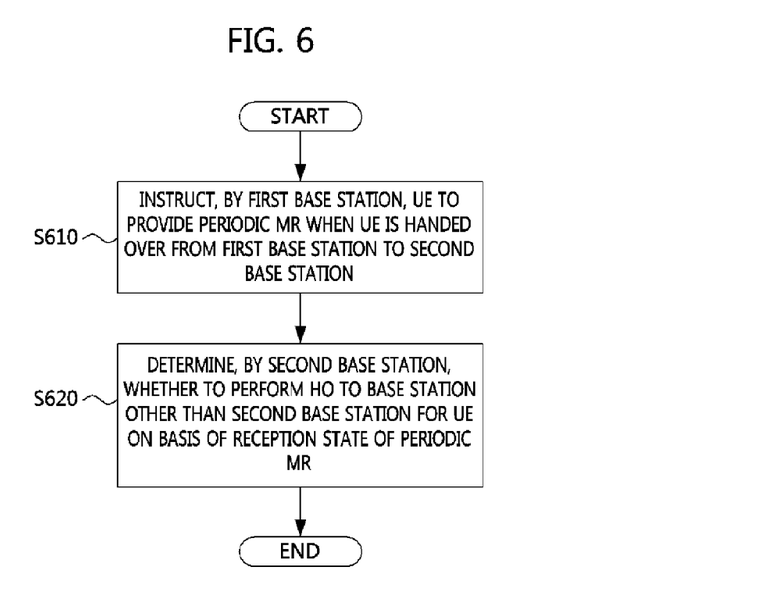
FIG. 6 is a flowchart illustrating a UE measurement-based method as another example of the mobility management method for use in the cellular mobile communication system according to an example embodiment of the present invention.

FIG. 6 is a flowchart illustrating the UE measurement-based method as another example of the mobility management method for use in the cellular mobile communication system according to an example embodiment of the present invention.

Referring to FIG. 6, the UE measurement-based method according to the example embodiment of the present invention may include: (a) instructing, by a first base station, UE to provide a periodic MR when the UE is handed over from the first base station to a second base station (S610); and (b) determining, by the second base station, whether to perform an HO to a base station other than the second base station for the UE on the basis of a reception state of the periodic MR (S620).

Referring to FIGS. 1 and 6 together, the UE measurement-based method according to the example embodiment of the present invention may include instructing the UE 40 to provide a periodic MR when the UE 40 is handed over from the cell A 10 to the cell C 30 (that is, operation S610). Through this, the UE 40 transmits the periodic MR to the base station, which controls the cell C 30, immediately after an ingress HO to the cell C 30. The base station counts the periodic MR and immediately makes an HO decision to another cell when sensing a state in which periodic MRs are not received in a designated cycle (that is, operation S620).

This method has an advantage in that the base station independently processes the above-described operation without an RLF or cooperation between base stations. However, signaling complexity increases and there is signaling overhead on a radio link. Accordingly, this method has an advantage in that, although it is not possible to directly prevent an HO from the cell A 10 to the cell 30, the RLF may be prevented as much as possible.

Figure 7:
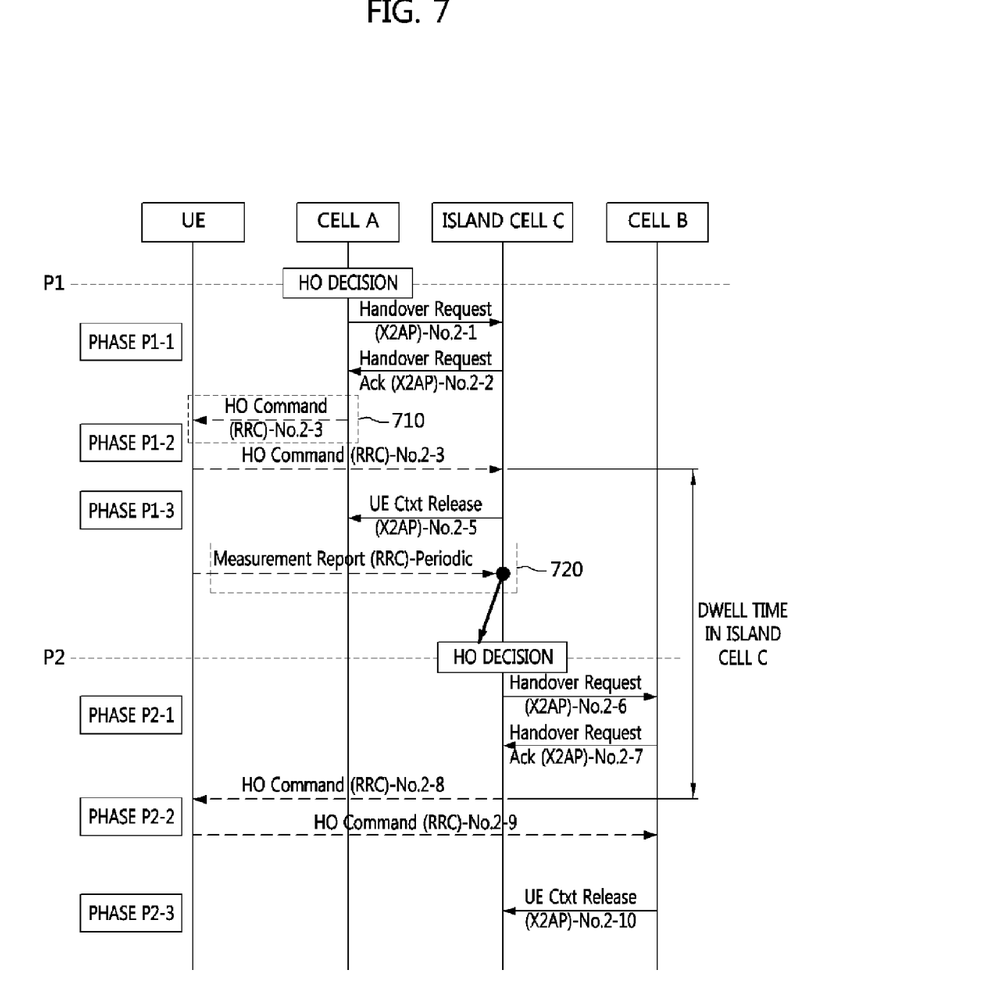
FIG. 7 is a sequence diagram showing an HO procedure between UE and base stations when the UE passes through the coverage hole in the UE measurement-based method according to an example embodiment of the present invention.

FIG. 7 is a sequence diagram showing an HO procedure between UE and base stations when the UE passes through the coverage hole in the UE measurement-based method according to an example embodiment of the present invention.

Referring to FIGS. 6 and 7 together, a command may be generated so that a periodic MR 720 is provided in a measurement configuration of mobility control information of an HO command message 710 of phase P1-2 in operation S610. Although a cycle of the periodic MR is set to 120 ms, 240 ms, 480 ms, 640 ms, . . . , 60 min in the current Long Term Evolution (LTE) standard, the cycle of the periodic MR may be set at discretion. For example, if the cycle of the periodic MR is set to a minimum of 120 ms, the periodic MR from the UE should arrive at the base station every 120 ms. However, if a result of a counting operation indicates that a designated number of periodic MRs are not received in a designated cycle, it is determined that there is a problem in a current serving cell, and the base station that controls the cell C 30 makes an HO decision by detecting a dwell time so far using the number of periodic MRs, and determining that the currently connected UE stays in its own cell C 30 as the island cell. That is, the HO decision is made by comparing an actual cycle in which the periodic MR (RRC) is received to the set cycle and considering the dwell time so far.

UE History-Based Method

Figure 8:
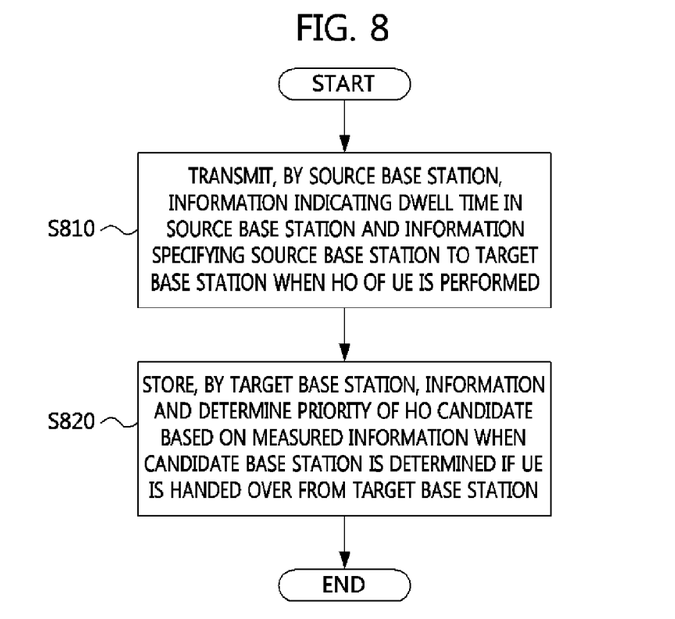
FIG. 8 is a flowchart illustrating a UE history-based method as still another example of the mobility management method for use in the cellular mobile communication system according to an example embodiment of the present invention.

FIG. 8 is a flowchart illustrating the UE history-based method as still another example of the mobility management method for use in the cellular mobile communication system according to an example embodiment of the present invention.

Referring to FIG. 8, the UE history-based method according to the example embodiment of the present invention may include: (a) transmitting, by a source base station, information indicating a dwell time in the source base station of UE and information specifying the source base station to a target base station during an HO of the UE (S810); and (b) storing, by the target base station, the information along with the same type of information transmitted from a base station other than the source base station as a type of the information, and determining priority of an HO candidate on the basis of the stored information upon decision of a candidate base station when the UE is handed over from the target base station (S820).

The UE history-based method according to the example embodiment of the present invention will be described with reference back to FIG. 1. The terminal 40 records information indicating dwelling cells and dwell times in the cells in a connection state. That is, the history-based method according to the example embodiment of the present invention may be configured so that a target cell is selected from among HO candidates by recognizing a cell in which a dwell time is short or a ping-pong cell such as the cell C 30, which is the island cell, on the basis of UE history data and excluding the cell C 30 when an HO from the cell A 10 to the cell C 30 is performed.

As compared to the above-described UE measurement-based method, an abnormal state such as the RLF may occur even if the island cell is recognized in a current serving base station without support of another base station. When the RLF occurs, it is difficult to collect accurate data. Although UE-specific control is possible while UE is connected, there is a disadvantage in that accumulated knowledge is relatively small. In addition, even when the UE history information is stored for common control for UEs, not UE-specific control, its use may be limited.

Figure 9:
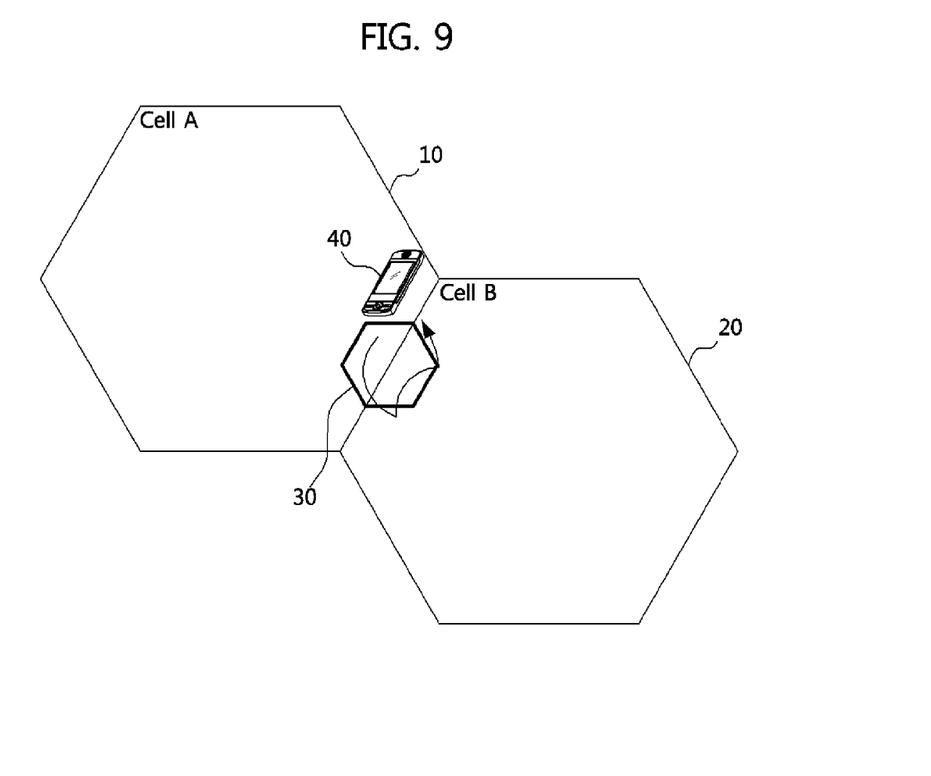
FIG. 9 is a conceptual diagram illustrating a state in which the UE history-based method is effective according to an example embodiment of the present invention.

FIG. 9 is a conceptual diagram illustrating a state in which the UE history-based method is effective according to an example embodiment of the present invention.

For example, when a UE trace as shown in FIG. 9 is shown (or when recognition is made as if the UE is on the move even when the UE is not actually moving), it is possible to prevent an HO to the island cell by detecting unnecessary ping-pong and the island cell.

When the source base station transmits information indicating the dwell time in the source base station of the UE and information specifying the source base station to the target base station in operation S810, UE history information may be transferred to the target base station in an HO request (X2AP) procedure (No. 2-6) illustrated in FIG. 2. The UE history information may also be configured as shown in FIG. 10 to be described later.

On the other hand, as in the above-described base station-based method, the dwell time in the source base station of the UE may be configured as a time from when the source base station has received an HO complete RRC message from the UE to when the source base station has transmitted an HO command RRC message to the UE.

In operation S820, the target base station continuously receives the UE history information transmitted from the source base station to the target base station in operation S810.

Figure 10:
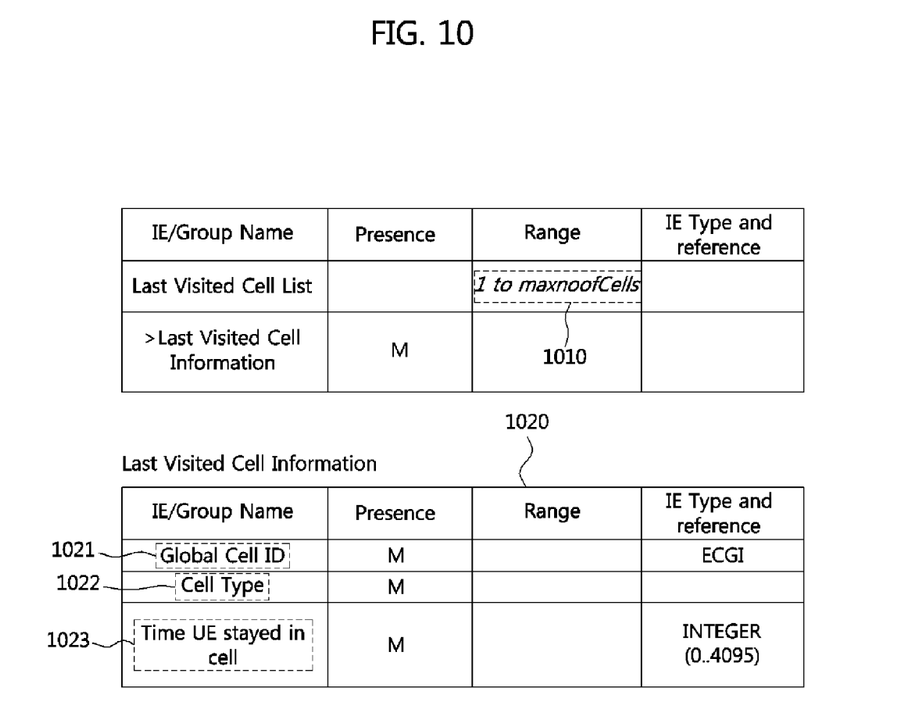
FIG. 10 is a data structure diagram illustrating an example of a UE history information configuration in the UE history-based method according to an example embodiment of the present invention.

FIG. 10 is a data structure diagram illustrating an example of a UE history information configuration in the UE history-based method according to an example embodiment of the present invention.

For the UE history information, an amount of information to be stored may be limited according to a method in which latest information is preferentially stored, or a dwell time for a source base station in which the dwell time is short and information specifying the source base station are preferentially stored if the amount of information exceeds an amount of information capable of being stored, that is, a predetermined amount (maxnoofCells: 1010). In addition, one record 1020 of the stored UE history information, that is, information to be transmitted through an HO request (X2AP) procedure (No. 2-6), may be configured to include an ECGI 1021 of the source base station, a cell type 1022, and a dwell time 1023 in the source base station. For example, the dwell time 1023 may be configured in units of seconds. In the example of FIG. 10, the dwell time 1023 has a range of 0 to 4095, and is set to 4095 sec when exceeding 4095 sec.

For example, assuming that the UE 40 is first connected to the cell A 10 and moves as shown in FIG. 1, an example of UE history information in a procedure of HO request (X2AP) No. 2-1 illustrated in FIG. 2 is as follows.

[0] Global Cell ID: Cell A's ECGI, Cell Type: e.g., large, DWELL TIME: 400 Sec

In a procedure of HO request (X2AP) No. 2-6 of FIG. 2, an example of UE history information is as follows.

[0] Global Cell ID: Cell C's ECGI, Cell Type: e.g., very small, DWELL TIME: 2 Sec

[1] Global Cell ID: Cell A's ECGI, Cell Type: e.g., large, DWELL TIME: 400 Sec

In operation S820, when the UE is handed over from the target base station using the stored information, priority of an HO candidate is determined on the basis of the stored information when a candidate base station is determined. That is, when the target base station determines the priority of the HO candidate on the basis of the stored information, a base station in which a dwell time is short has low HO priority and is excluded from the HO candidate, so that an HO to the island cell may be prevented.

According to the configuration of the example embodiment of the present invention, it is possible to reduce an HO failure and an unnecessary HO due to a coverage hole. The above-described three techniques have different advantages and disadvantages. When the three techniques are used together, it is possible to solve a problem of the coverage hole in a mutually complementary manner.

The base station-based method, the UE measurement-based method, and the UE history-based method described above may be independently operated or used together.

While the example embodiments of the present invention and their advantages have been described in detail, it should be understood that various changes, substitutions and alterations may be made herein without departing from the scope of the invention.

What is claimed is:

1. A mobility management method of a target base station for use in a cellular mobile communication system, comprising:
    (a) receiving, from the source base station, information specifying a source base station and at least one of information indicating a dwell time in the source base station of UE and information indicating that the dwell time is equal to or less than a predetermined threshold during an HO of the UE; and
    (b) storing the information along with the same type of the information, which is transmitted from a base station other than the source base station and determining priority of an HO candidate on the basis of the stored information upon decision of a candidate base station when the UE is handed over from the target base station.

2. The mobility management method of claim 1, wherein the dwell time in the source base station of the UE is a time from when the source base station has received an HO complete RRC message from the UE to when the source base station has transmitted an HO command RRC message to the UE.

3. The mobility management method of claim 1, wherein operation (a) includes receiving the information indicating the dwell time and specifying the source base station by using an HO request X2AP message from the source base station.

4. The mobility management method of claim 1, wherein, when the target base station stores the information in operation (b), latest information is preferentially stored if the amount of information exceeds an amount of information capable of being stored.

5. The mobility management method of claim 1, wherein, when the target base station stores the information in operation (b), a dwell time for a source base station in which the dwell time is short and information specifying the source base station are preferentially stored if the amount of information exceeds an amount of information capable of being stored.

6. The mobility management method of claim 1, wherein, when the target base station determines the priority of the HO candidate on the basis of the stored information in operation (b), a base station in which a dwell time is short has low HO priority and is excluded from the HO candidate.

7. The mobility management method of claim 3, wherein the information indicating that the dwell time is equal to or less than the predetermined threshold in operation (a) is designated as one HO report type, which is an enumerated information element (IE) defined in the HO report X2AP message.

8. The mobility management method of claim 1, wherein the information specifying the source base station is enhanced cell global identifier (ECGI) information of the source base station.

* * * * *